Aug. 8, 1950     C. C. FREDERICKS     2,517,997
POWER-DRIVEN MIXER
Filed April 25, 1946     2 Sheets-Sheet 1
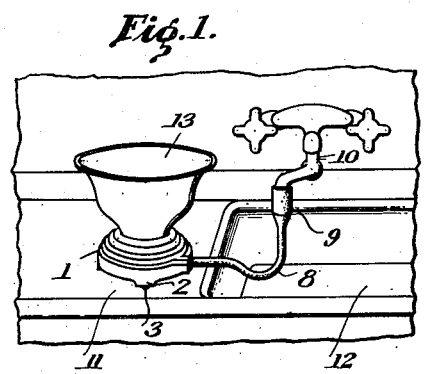
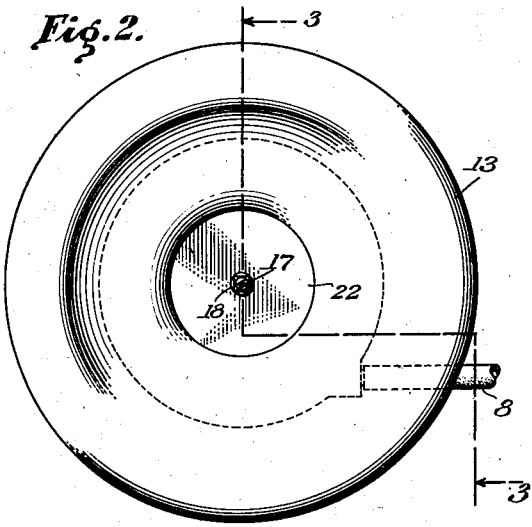
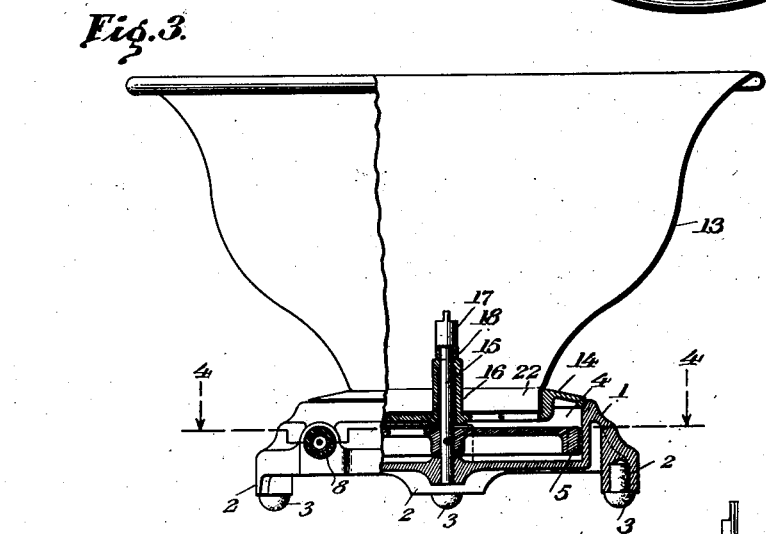
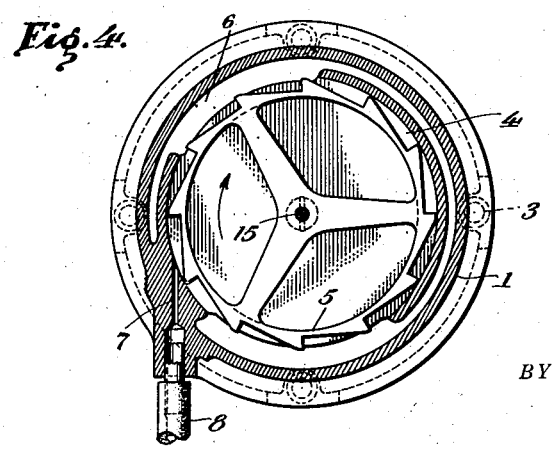
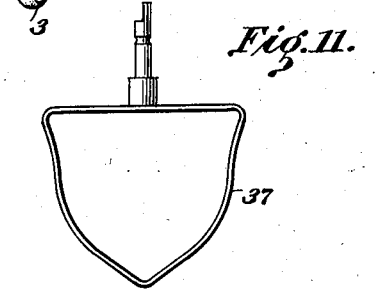
INVENTOR
Charles C. Fredericks
BY Victor J. Evans & Co.
ATTORNEYS

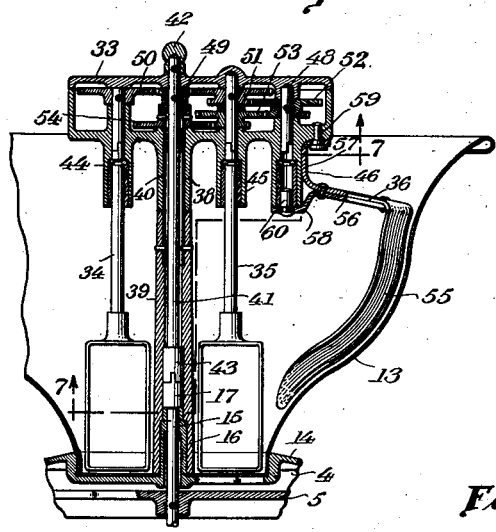
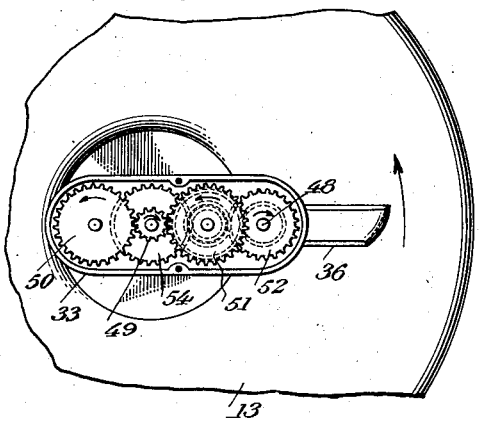
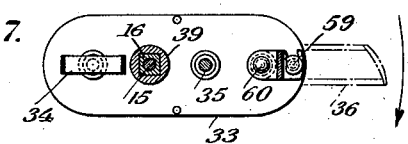
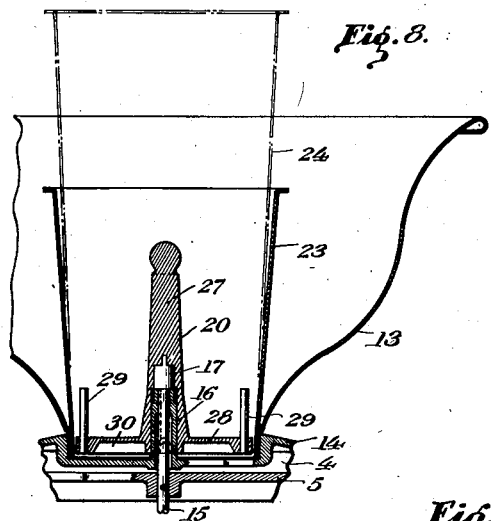
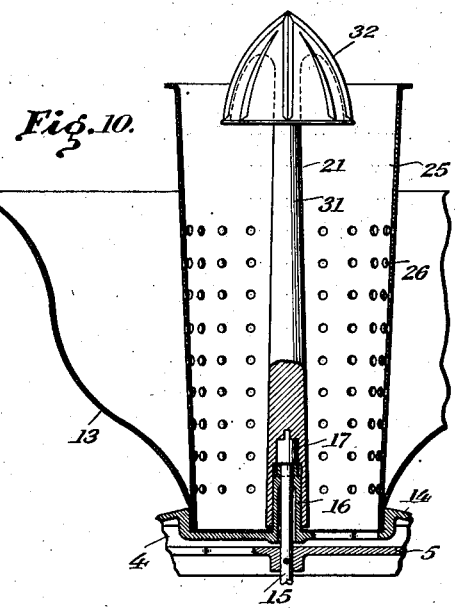
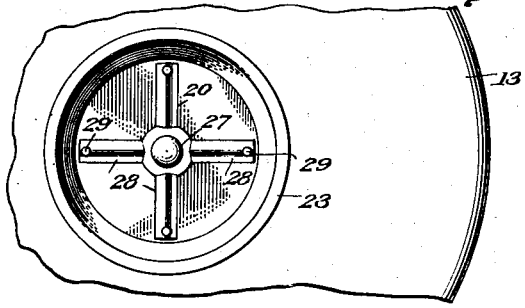

Patented Aug. 8, 1950

2,517,997

UNITED STATES PATENT OFFICE 2,517,997

POWER-DRIVEN MIXER

Charles C. Fredericks, Los Angeles, Calif.

Refiled for application Serial No. 53,414, October 8, 1948. This application April 25, 1946, Serial No. 664,731

9 Claims. (Cl. 259—108)

This invention relates to power driven mixers and has for the primary object the provision of a portable device which is adapted for thoroughly mixing various food ingredients, either when said ingredients remain in liquid form or mixed into a semi-liquid or viscous state and is also adapted for extracting juices from fruit and the like and to bring about separation of the residue or pulp and seeds from the juice.

Another object of this invention is the provision of a novel means for the transmission of power from a power means to the agitating means, the later being composed of a multiplicity of agitators whereby the agitators will be rotated about their own axes and also rotate as a single unit to cause a constant variation of the agitators within the ingredients during the mixing operation.

A further object of this invention is the provision of means whereby the agitators may be interchanged with the transmission means to successfully bring about a varied mixing of the ingredients or the conversion of the device for the extraction of juices.

A still further object of this invention is the provision of a device of this character which may be successfully driven by water pressure, being readily adapted to a faucet, either of a hot or cold water main and the construction being such that the ingredients to be mixed may be heated during the mixing operation by the hot water acting to drive the device.

Another object of the invention is the provision of a device of the character set forth wherein a small compact liquid driven motor is provided which motor is adapted to furnish the requisite power to run the agitator. More specifically, the liquid motor includes a rotor supported within a circular rotor chamber having an inlet thereinto and having a pair of outlets arranged on opposite sides of the inlet and substantially diametrically opposite to each other and in proximity to the inlet. One outlet is on the high pressure side of the rotor spaced from the inlet and the other outlet is on the low pressure side of the rotor in proximity to the inlet.

Another object is to provide in an agitator structure of the character described an assembly wherein there is a bowl mounted upon a support which support carries driving mechanism including a drive shaft that extends upwardly through the bottom of the bowl and wherein there is associated with the bowl a container mounted therein and defining therewith a chamber between the container and the bowl and wherein the drive shaft extends also through the bottom of the container and terminates therein in an agitator or other working head.

A meritorious feature is the provision in a structure of the character described of a supporting casing for the bowl or container which casing includes a fixed sleeve that extends upwardly through the bottom of the bowl and/or container and wherein there is mounted within the casing drive mechanism including a drive shaft extending therefrom upwardly through the sleeve and terminating thereabove in a part adapted to engage a working head device, and wherein the sleeve is provided with a circular portion for a part of its length and a non-circular portion for another part of its length for purposes hereinafter more particularly set forth.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a perspective view illustrating a mixer constructed in accordance with my invention and showing the same connected to a faucet, Figure 2 is a top plan view showing the mixing bowl with the agitating means removed, Figure 3 is a sectional view taken on the line 3—3 of Figure 2, Figure 4 is a sectional view taken on the line 4—4 of Figure 3 showing the rotor of the fluid actuated drive means, Figure 5 is a fragmentary vertical sectional view showing the agitating means mounted for operation in the bowl.

Figure 6 is a fragmentary sectional view showing the gearing of the transmission, Figure 7 is a detail sectional view showing a rotatable transmission housing and the means of detachably securing thereto an agitator of the scraping type and taken on the line 7—7 of Figure 5, Figure 8 is a fragmentary sectional view showing my invention adapted for the mixing of liquids, Figure 9 is a fragmentary top plan view illustrating the same, Figure 10 is a fragmentary vertical sectional view showing my invention adapted for the extraction of juices, Figure 11 is a side elevation illustrating an agitator which may be substituted for the transmission for the agitator of the scraper type.

This application is a refile of my application 53,414, forfeited for non-payment of final fee.

Referring in detail to the drawings, the numeral 1 indicates a base supported by comparatively short legs 2 provided with cushion tips or feet 3. The base is chambered as shown at 4, and in which operates a fluid driven rotor 5. The chamber 4 has an intake port 7 constructed in the form of a nipple to which is connected a hose 8, the latter being equipped with an adapter 9 for detachably connecting the hose to a faucet 10.

The chamber is provided with an exhaust port 6 downwardly through the bottom of the chamber and disposed spaced from the intake but relatively adjacent thereto as shown in Figure 4. The chamber is also provided with a secondary exhaust port 6—a disposed approximately diametrically opposite the exhaust port 6. Water under pressure from the faucet enters the chamber and acts upon the rotor and leaves the chamber by way of the exhaust ports 6 and 6—a. Exhaust port 6—a is also sufficiently close to intake port 7 to relieve any back pressure which might develop from water escaping backwardly over the rotor from the intake. Due to the provision of the primary exhaust port 6 and the secondary exhaust port 6—a the rotor is adapted to develop, even in a small size, ample power to suitably drive the agitator. A rotor of 4 1/16 inches diameter driven by city water pressure of 60 pounds or thereabouts has proved satisfactory. The base of the casing may be positioned on a drain board 11 of a sink 12 and the water employed for driving the rotor may exhaust from the base downwardly on the drain board and thence into the sink or the base may be placed within the sink. The showing made in Figure 1 suggests the connection of this invention to a faucet capable of dispensing either hot or cold water employed for the actuation of the rotor and when using hot water the latter may heat the base 1 which in turn heats a mixing bowl 13 carried by the base so that any ingredients in the bowl for mixing may be thoroughly heated.

The chamber 4 of the base is closed by a removable cover 14 having a seat in which the bowl 13 is secured by friction or any other suitable means. Thus it will be seen that heat from the base will be readily transmitted to the bowl and the cover 14 may be secured to the base for closing the chamber 4 by friction or any other suitable means.

A vertical power shaft 15 is journaled at one end within the base 1 and traverses the chamber 4 and has the rotor 5 secured thereto. The shaft 15 extends a limited distance upwardly into the bowl. Its upward extension into the bowl is rotatably supported within a fixed sleeve portion 16 which forms a part of the cover 14. The upper end of the shaft 15 is in the form of a coupling element 17. The upper end of the sleeve 16 is shouldered or provided with square faces 18. The coupling element 17 rests rotatably upon the upper end of sleeve 16. Thus it will be seen that agitating means which will be hereinafter more fully described may be readily supported in the bowl by the sleeve 16 and be coupled to the shaft 15 so as to be driven by the rotor 5.

Adaptable to the shaft 15 and the sleeve 16 are agitating means 19 and 20 and a juice extractor 21.

The bowl 13 where the latter fits in the seat of the cover 14 is of a reduced diameter and provides a seat 22 to receive either one of a series of cylindrical containers 23, 24 and 25. Said containers are similarly constructed, being open at each end and when positioned in the seat will have the lower end closed by the bottom of the bowl. The containers 23 and 24 vary in length having different capacities for liquid ingredients and may be employed separately or jointly, as shown in Figure 8. The containers 23 and 24 may be closed by a suitable cover (not shown). The container 25 is similar in construction to the container 24 except that the walls thereof have rows of perforations 26, the purpose of which is to permit liquid received in the container 25 to pass into the bowl and to prevent the passing of bulky substance from the container into the bowl.

The agitator 20 operates in connection with either the container 23 or the container 24, while the juice extractor 21 operates in conjunction with the container 25.

The agitator 20 consists of a post 27 socketed to receive the sleeve 16 and rotate freely thereon. The walls of the socket of the post 27 are of a shape to engage with the coupling element 17 to establish a drive between the drive shaft 15 and the post 27.

Extending radially from the lower end of the post 27 are agitating arms 28 (Figures 8 and 9) to which arms may be secured pins 29 extending at right angles to the arms and acting to increase the agitating action of the arms. Said arms have grooves 30 opening downwardly through the lower faces of the arms. The arms lie in close proximity to the bottom of the bowl so that during the rotation of the arms the grooves thereof develop a partial vacuum in the lower end of the container for the purpose of causing passage of air through the content of the container for the purpose of aerating said content.

The containers 23 and 24 can be readily removed from the bowl and the container 25 inserted therein. The agitator 20 can be readily disconnected and the extractor 21 can be readily connected to the coupling 17 of the shaft 15. The extractor 21 consists of a post 31 socketed to receive the sleeve 16 and rotate freely thereon and has the walls of the socket shaped to receive the coupling 17 thereby establishing drive between the post and the shaft 15. Integral with the upper end of the post 31 is a ribbed frustoconical shaped head 32 which projects a limited distance above the upper end of the container 25. The head 32 is for the purpose of boring into half sections of fruit for the purpose of extracting the juices and pulp from the rind which the juice and pulp gravitate into the container and the juice flows through the perforations 26 into the bowl while the pulp or residue remains in the container. Thus the juices free of residue may be poured from the bowl by tipping.

The agitating means 19 consists of an elongated housing 33 to provide an enclosure for gear transmission and supporting means for agitating elements 34, 35, 36 and 37 and has formed integrally therewith a collar 38 acting as a journal or bearing for a driven shaft 41. A sleeve 39 surrounds the shaft 41 and abuts one end of the collar 38 and has secured thereto an internal sleeve 40 which extends through the collar 38 into the housing 33. The sleeve 39 is shaped to fit over the sleeve 16 and be held against rotation. A shaft 41 is located within the sleeve 39 and the internal sleeve 40 and extends through the housing 33 and has removably secured to its upper end a retaining element 42 acting to rotatably connect the housing to the shaft 41. Said shaft 41 carries a coupling element 43 adapted to detachably interfit with the coupling element 17 to establish a driving connection between the drive shaft 15 and said shaft 41. The collar 38 is journaled on the sleeve 39, consequently permitting the housing 33 to rotate.

Formed on and depending from the housing 33 are bearing collars 44, 45 and 46 and extending into said bearing collars from the interior of the housing are gear shafts 48. The bearing collars 44 to 46, inclusive receive stems of the agitating elements 34 to 37, inclusive. The stems of said agitating elements are journaled and releasably secured in the bearing collars. The stems of the agitating elements 34, 35 and 37 are constructed to couple with the gear shafts 48. The agitating elements 34 and 35 operate in conjunction with the bearing collars 44 and 45, while the stem of the agitating element 36 operates in conjunction with the bearing collar 46. Also operating in conjunction with the bearing collar 46 is the agitator 37 (see Figure 11). However, the latter is not employed during the employment of the agitating element 36 nor is the agitating element 35 employed during the use of the agitating element 37.

Located in the housing 33 are gears 49, 50, 51, 52, 53 and 54. The gears 51, 52 and 53 are of a double type and mesh with one another to form a train of gears and the gear 53 meshes with the gear 54 while the gears 51 and 50 mesh with the gear 49. The gear 54 is secured to the internal sleeve 40 and becomes a fixed gear due to the fact that the internal sleeve being secured to the sleeve 39 does not rotate, the sleeve 39 being held against rotation by fitting on the sleeve 16. The gear 49 is secured to the shaft 41 and being in mesh with the gears 50 and 51 causes the gear shafts 48 of the bearing collars 44 and 45 to be driven from the shaft 41. The gear 52 is secured to the gear shaft 48 of the bearing collar 46 and being in mesh with the gears 51 and 53 will be driven from the gear 49 and cause the gear 53 to walk about the fixed gear 54 and as the gear 53 is located eccentrically of the shaft 41 which rotatably supports the housing 33, the latter will be caused to rotate. Also it will be seen that the gear shafts 48 heretofore described are rotated from the shaft 41 and the agitating elements connected to the gear shaft will be rotated and during the rotation of the agitating elements about their respective axis said agitating elements will be carried in a circular path within the bowl due to the rotation of the housing 33 thereby bringing about a thorough and efficient mixing of the ingredients located in the bowl. The rotation of the agitator elements 34 and 35 within the ingredients will set up a centrifugal motion to said ingredients and the agitating element 36 carried by the housing 33 will set up a centrifugal action in the ingredients which will be in opposition to the centrifugal action set up by the rotating agitating elements. The agitating element 36 consists of a blade 55 shaped and curved to conform to the contour of the bowl and has one edge so disposed that it travels in close proximity to the interior walls of the bowl for scraping or removing ingredients adhering to said walls. The agitating element 36 also includes an arm 56 integral with the blade 55 and has bifurcated portions 57 and 58. The portion 57 is notched to form a hook engageable with a pin 59 on the housing 33 whereby the portion 57 is releasably secured to said housing. The portion 58 carries a pin 60 received in the bearing collar 46. During the disengaging of the hook of the portion 57 from the pin 59 the pin 60 of the portion 58 may be placed in or removed from the bearing collar 46.

The described centrifugal actions on the ingredients in the bowl will prevent said ingredients from being splashed or spilled out of the bowl during the mixing operation.

A device of the character described may be manufactured and sold at a low cost and may be operated at a minimum expense and it will be noted that the various moving parts are so constructed and assembled that a minimum number of bearings are employed and that the various parts may be readily disassembled to permit easy cleaning of the device so that it may be kept in a highly sanitary condition.

What I claim is:

1. A mixer comprising a bowl having the diameter of a portion thereof reduced to form a seat engaging part, supporting means chambered to form a seat receiving said seat engaging part with the latter having a tight fit therewith, agitator driving means carried by said first means and projecting through the seat part of the bowl and centrally located relative thereto, an agitator removably supported by said second means and driven thereby for agitating ingredients within the bowl, and a container arranged in the bowl and frictionally contacting the seat engaging part and having the agitator operating therein and cooperating with the bowl in forming between itself and the bowl a chamber.

2. A mixer comprising a bowl having the diameter of a portion thereof reduced to form a seat engaging part, supporting means chambered to form a seat receiving said seat engaging part, drive means carried by said first means and projecting through the seat part of the bowl and arranged centrally thereof, and a boring means supported by and releasable from and driven by said drive means to remove pulp and juice from the rind of fruit, and a perforated container resting in said seat engaging part of the bowl with said boring means projecting therefrom to catch the refuse and juice of the fruit and permit the juice to pass into the bowl.

3. A fluid operated mixer comprising, in combination, a base member having a hollow interior forming a fluid tight chamber, a vertical shaft journaled in said base member having a part extending into said chamber and a part extending upwardly from the top of the base member, a fluid pressure rotor in said chamber secured to said shaft for joint rotation, means for introducing fluid under pressure into said chamber to cause said rotor to rotate, a sleeve forming an integral part of said base member extending around the upper outside part of said shaft, said sleeve having a cylindrical exterior for a portion of its length and a flat sided exterior for another portion of its length forming a support about which agitating devices may be removably secured while they receive their motive power from said shaft in the sleeve.

4. A mixer comprising, in combination, a base member, a shaft extending vertically above the top of said base member and rotatively secured in said base member, means in said base member for rotating said shaft, a sleeve forming an integral part of said base member surrounding a portion of said shaft above the base member, said shaft extending beyond said sleeve and provided with a coupling head, a receptacle removably supported upon the top of said base member and provided with an aperture in the bottom thereof through which said shaft and said sleeve may extend when the receptacle is supported upon said base member, and an agitating device having a part removably connected to said coupling head and having a sleeve of larger diameter than said first mentioned sleeve overlapping said removable part and contactually embracing the first mentioned sleeve to support the agitating device in an upright manner in the receptacle.

5. A fluid operated mixer comprising, in combination, a base member, a mixer bowl removably supported on said base and provided with an aperture centrally located in the bottom of the bowl, said base member being hollow to form a chamber, a fluid pressure motor rotatively supported in said chamber, means for introducing fluid under pressure into said chamber to rotate said motor, a vertical shaft operatively associated with said rotor and extending upwardly through the top wall of said chamber and through said aperture in the bottom of said bowl, a sleeve fixed to the top of said base member extending around a portion of the shaft in said bowl and likewise extending through said aperture in the bottom of the bowl, said shaft being enlarged at its upper extremity to overlie said sleeve and shaped for interlocking engagement with any means suitably shaped for this purpose, said sleeve provided with a cylindrical exterior for a portion of its length and a flat sided exterior for another portion of its length whereby agitating devices may be removably secured to said sleeve while movable parts thereof are interlockingly connected to the extremity of said shaft, and an agitating device having a hollow depending sleeve telescopingly received over said first mentioned sleeve for support in upright position, and means within said depending sleeve for removably interlocking the agitating device to said shaft and receive driving impulses therefrom.

6. A fluid operated mixer comprising, in combination, a base member having a hollow interior forming a fluidtight chamber, a fluid pressure rotor in said chamber, a vertical shaft coupled with the rotor for rotation therewith and journaled in said base member and having a part extending upwardly through the top of the base member, means for introducing fluid under pressure into said chamber to cause said rotor to rotate, a sleeve forming an integral part of said base member extending around the upper outside part of said shaft, said sleeve having a cylindrical exterior for a portion of its length adapted to serve as a bearing for a second sleeve rotatably received thereover and having a non-cylindrical exterior for another portion of its length adapted to serve as a support for a second sleeve non-rotatably received thereover and engaged with the non-cylindrical exterior against relative rotation.

7. A household mixing apparatus comprising, in combination, a base member, a mixer bowl member supported on said base member and provided with an aperture substantially centrally located in the bottom thereof, a rotatable drive shaft extending vertically above the top of said base member and upwardly through said aperture in the bottom of said bowl member, means in said base member for rotating said shaft, the upper end of said shaft being shaped for interlocking engagement with any means suitably shaped for this purpose, a sleeve fixed to one of said members enclosing at least a portion of the length of said shaft and provided with a cylindrical exterior for a part of its length and a flat sided exterior for another part of its length, an agitating device having a hollow depending sleeve adapted to be telescopingly received over said first mentioned sleeve and provided interiorly with a cylindrical surface for a part of its length adapted to contactually engage the cylindrical exterior part of the first sleeve and a flat sided surface for another part of its length adapted to contactually engage the flat sided exterior part of the first sleeve to thereby immovably support the agitating device in upright position in the bowl member, a rotatable driven shaft in the hollow sleeve of the agitating device having the lower end thereof shaped for interlocking engagement with the upper end of said drive shaft, and means on the upper end of the sleeve of the agitating device supporting one or more rotating agitating elements depending therefrom into the bowl member and operatively connected to said driven shaft to receive driving impulses therefrom.

8. In combination with a mixing bowl having a rotatable drive shaft projecting upwardly from the bottom thereof, an agitating device for mixing contents in the bowl comprising a depending hollow sleeve having the lower end section thereof shaped to be received over the drive shaft, means adjacent to the bottom of said bowl for engaging said sleeve and supporting the same in upright position and holding the same against rotation, a driven shaft rotatably coaxially mounted within said sleeve having the lower end terminating short of the lower end of the sleeve and shaped for coupling engagement with the drive shaft to receive rotating impulses therefrom, a head surmounting said sleeve and journaled for rotation about the axis of the sleeve, said head having lateral extending portions on either side of the axis of the sleeve, agitating elements carried by the lateral extending portions of said head and depending downwardly into the bowl, means journaling said agitating elements in said lateral projecting portions for rotation about axes parallel but eccentric to the axis of rotation of the head, and means in the head operatively coupling the driven shaft to the head and to the agitating elements and adapted upon rotation of the drive shaft to rotate the head and the elements about their respective axes.

9. In combination with a household mixing bowl having a rotatable drive shaft projecting upwardly from the bottom thereof, an agitating device for mixing the contents of the bowl comprising a depending hollow sleeve having the lower end section thereof shaped to be received over the drive shaft, means adjacent to the bottom of the bowl for engaging said sleeve and for supporting the same in upright position in the bowl and for holding the same against rotation, a driven shaft rotatably coaxially mounted within said sleeve having the lower end thereof terminating short of the lower end of the sleeve and shaped for coupling engagement with the upper end of the drive shaft to receive rotating impulses therefrom, the upper end of said drive shaft projecting beyond the upper end of said sleeve, a head carried upon the upper projecting end of said driven shaft having two lateral extending portions projecting from opposite sides of the axis of the driven shaft, a rotatable stub shaft in one of said projecting portions of the head extending in spaced parallel relation to the axis of said driven shaft, a pair of rotatable stub shafts in the other of said projecting portions of the head extending in spaced parellel relation to one another and to the axis of said driven shaft, means for disconnectibly coupling depending agitating elements to said stub shafts for mixing the contents of the bowl, and means for operatively coupling said driven shaft to said head to rotate the same and to said stub shafts to rotate the same, said means rotating one of said stub shafts in a direction counter to the direction of rotation of the other two stub shafts.

CHARLES C. FREDERICKS.

REFERENCES CITED

The following references are of record in the file of this patent:

UNITED STATES PATENTS

| Number | Name | Date |
|---|---|---|
| 787,979 | Falconer | Apr. 25, 1905 |
| 800,684 | Schneider | Oct. 3, 1905 |
| 917,116 | Owen | Apr. 6, 1909 |
| 1,087,152 | Thompson | Feb. 17, 1914 |
| 1,154,772 | Hollstein | Sept. 28, 1915 |
| 1,323,542 | Naylor | Dec. 2, 1919 |
| 1,391,605 | Belden | Sept. 20, 1921 |
| 1,403,485 | Connor | Jan. 17, 1922 |
| 1,415,735 | Trust | May 9, 1922 |
| 1,473,454 | Albano | Nov. 6, 1923 |
| 1,752,202 | Robinson | Mar. 25, 1930 |
| 1,782,245 | Parkhill | Nov. 18, 1930 |
| 2,057,564 | Edgerton | Oct. 13, 1936 |
| 2,160,388 | Morse | May 30, 1939 |
| 2,203,135 | Farrington | June 4, 1940 |

OTHER REFERENCES

American Inventor, April 1906, vol. 15, No. 4, page 101, published at 114 Liberty Street, New York.